United States Patent [19]
Seyferth et al.

[11] Patent Number: 4,871,826
[45] Date of Patent: Oct. 3, 1989

[54] LEWIS BASE ADDUCTS OF DECABORANE FOR FORMING NEW PRECERAMIC POLYMERS, USING AS BINDERS, FORMING SHAPED BODIES AND FORMING FIBERS

[75] Inventors: Dietmar Seyferth, Lexington; William S. Rees, Jr., Arlington, both of Mass.

[73] Assignee: Massachusetts Institute of Technology, Cambridge, Mass.

[21] Appl. No.: 65,224

[22] Filed: Jun. 22, 1987

[51] Int. Cl.$^4$ .................. C08G 79/08; C04B 35/58
[52] U.S. Cl. ........................... 528/4; 501/96; 423/276; 423/284; 423/285; 423/294
[58] Field of Search ............ 528/4; 423/276, 284, 423/285, 294; 501/96

[56] References Cited

U.S. PATENT DOCUMENTS

| | | |
|---|---|---|
| 3,035,949 | 5/1962 | Parshall . |
| 3,141,856 | 7/1964 | Reiner et al. . |
| 3,155,630 | 11/1964 | Schroeder . |
| 3,344,108 | 9/1967 | Drinkard ............................ 528/4 |
| 3,354,121 | 11/1967 | Knoth et al. ........................ 528/4 |
| 3,453,092 | 7/1969 | Hawthorne et al. ............... 423/284 |
| 3,455,661 | 7/1969 | Hough et al. ...................... 423/284 |
| 3,850,820 | 11/1974 | Korshak et al. ................... 528/4 |

FOREIGN PATENT DOCUMENTS 0311935  10/1971  U.S.S.R. ................. 528/4

OTHER PUBLICATIONS

R. Thompson, "The Chemistry of Metal Borides & Related Compounds" in Progress in Boron Chem., vol. 2, pp. 178–230 (1970).
R. H. Wentorf, Jr., in "Kirk–Othmer Ency. of Chem. Tech", 3rd ed., vol. 4, pp. 126–127 (1978).
Cragg, et al, J. Chem. Soc. A. (1970) 1817.
Schroeder, et al, J. Inorg. Chem. 26, 3998 (1961).
12th Sampe Symposium AC-2.

*Primary Examiner*—Wilbert J. Briggs, Jr.
*Attorney, Agent, or Firm*—George W. Neuner; Ronald I. Eisenstein

[57] ABSTRACT

New soluble preceramic polymers formed by reacting $B_{10}H_{14-n}R_n$, (where R is a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, or a substituted or unsubstituted lower aryl group having from 6 to about 10 carbon atoms, and n is a number from zero to about six) with a diamine in an organic solvent are disclosed. Preferably the diamine has the formula $$R^1R^2N\text{-}R^3\text{-}NR^4R^5$$

where $R^1$, $R^2$, $R^4$ and $R^5$ are H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted lower aryl group having from 6 to about 10 carbon atoms, or a di- or triorganosilyl. $R^3$ is a lower alkylene group having from 1 to about 8 carbon atoms, a substituted or unsubstituted cycloalkylene group having from 3 to about 8 carbon atoms, a substituted or unsubstituted lower alkenylene group having from 2 to about 8 carbon atoms, a substituted or unsubstituted lower arylene group having from 6 to about 10 carbon atoms, a substituted or unsubstituted polyarylene group, a heteroatom-containing alkylene group, a heteroatom-containing cycloalkylene group, a heteroatom-containing alkenylene group, or a heteroatom-containing arylene group.

A method of using Lewis base adducts of decaborane of the formula $$B_{10}H_{12-n}R_n\cdot 2L,$$

where R and n are as defined above and L is any neutral Lewis base, can be used as binders for ceramic powders is also disclosed.

And a method of using these Lewis base adducts as precursors in forming shaped ceramic bodies is also described.

19 Claims, 1 Drawing Sheet

LEWIS BASE ADDUCTS OF DECABORANE FOR FORMING NEW PRECERAMIC POLYMERS, USING AS BINDERS, FORMING SHAPED BODIES AND FORMING FIBERS

The Government has rights in this invention pursuant to Contract Number N00014-85-K-0645 awarded by the Department of the Navy.

The present invention is directed to using Lewis base adducts of decaborane (hereinafter sometimes referred to as Lewis base adducts) (1) for preparing preceramic polymers containing boron, and their pyrolysis to ceramic materials; (2) as a binder for ceramic powders and pyrolyzing to form a ceramic body; (3) for formation into shaped objects and subsequent pyrolysis to give a ceramic material of the same shape; and (4) for forming fibers whose subsequent pyrolysis yields ceramic fibers.

There is a large amount of interest in boron-containing ceramic materials, boron carbide, $B_4C$, boron nitride, BN, boron phosphides, BP, $B_{12}P_2$, and $B_{13}P_2$, aluminum boride, $AlB_{12}$, and boron silicides, $B_4Si$, $B_6Si$ and $B_{12}Si$, because of their outstanding chemical and/or physical properties [See R. Thompson, "The Chemistry of Metal Borides and Related Compounds", in "Progress in Boron Chemistry", Vol. 2, R. J. Brotherton and H. Steinberg, ed., Pergamon, London, 1970, pp. 173-230; R. H. Wentorf, Jr., in "Kirk-Othmer Encyclopedia of Chemical Technology", Third Edition, Vol. 4, Wiley, New York, 1978, pp. 126-127.]

Boron carbide can exist in a range of compositions which are variations of a rhombohedral $B_{12}C_3$ lattice. In the ideal $B_4C$ composition, 12 boron atoms are at the vertices of an almost regular icosahedron. The closely packed $B_{12}$ icosahedra are linked together by direct B—B bonds, but there is sufficient interstitial space to accommodate chains of up to 3 carbon atoms (FIG. 1). If all interstitial atom spaces are filled with carbon, in a —C—C—C— chain, then we have pure stoichiometric $B_4C$. However, less carbon may be contained. In the $B_{12}C_3$ structure, each boron atom is bonded to five others in the icosahedron as well as either to a carbon atom or to a boron atom in an adjacent icosahedron.

Pure $B_4C$ can be prepared by heating the elements together at above 1600° C. Chemical vapor deposition, i.e., the high temperature reaction of, for example, $BCl_3$ and $CCl_4$ in an atmosphere of $H_2$, has been used to prepare $B_4C$, as has the reaction of $BCl_3$ with a hydrocarbon in a hydrogen plasma jet. Crude, commercial boron carbide, used mainly as an abrasive, is typically prepared either by resistance or arc-heating of a mixture of $B_2O_3$ and carbon, with or without added Mg.

As a result of its rigid framework of relatively closely bonded atoms, pure boron carbide has useful properties. It has a mp of 2450° C. and a density of 2.52 g/cm³. Its cold microhardness (VPN) is ~4000 kg/mm² (vs 2500 kg/mm² for SiC) or 270 kbar on the Knoop scale (diamond indenter). It exhibits appreciable electrical conductivity and has a high compressive strength. Its brittleness limits its useful tensile strength to about 1.5 kbar at 950° C. Because of this and also because of its moderate coefficient of thermal expansion, it is sensitive to thermal shock. It is a high temperature semiconductor. Boron carbide is noticeably oxidized in air at 800°-1000° C.; it is resistant to most acids but is rapidly attacked by molten alkalies. It withstands steam at 300° C.

The major applications of boron carbide are based on its great hardness or the high neutron absorptivity of the $^{10}B$ isotope, among the highest known. Hot-pressed $B_4C$ is used in wear parts, sandblast nozzles, seals and ceramic armor plates. It is used in the shielding and control of nuclear reactors, its neutron absorptivity, chemical inertness and radiation stability being the properties of importance.

It would be useful to have a polymer precursor for $B_4C$ that can be readily formed, and is stable at room temperature. Additionally, it should be a processible precursor, i.e., one that is soluble in organic solvents and/or fusible. A further requirement is that the ceramic precursor give a high yield ($>60\%$) of ceramic residue on pyrolysis. High ceramic yields minimize shrinkage on pyrolysis and the destructive effect of evolved volatiles on the molecular microstructure.

It would also be useful to have methods for using certain readily available boron-containing compounds whose pyrolysis under appropriate conditions gives a ceramic material containing boron carbide as the major constituent. Such preceramic materials would be useful in:

(1) the preparation of ceramic fibers;
(2) the preparation of ceramic coatings, particularly on otherwise oxidizable materials;
(3) use as binders for boron carbide and other ceramic powders; and
(4) forming into shaped bodies whose subsequent pyrolysis gives a ceramic material of the same shape.

SUMMARY OF THE INVENTION

We have now discovered soluble preceramic boron-containing polymers of type $[B_{10}H_{12-n}R_n\text{-}R^1R^2N\text{-}R^3\text{-}NR^4R^5]$. These polymers are formed by reacting $B_{10}H_{14-n}R_n$, (where R is a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, or a substituted or unsubstituted lower aryl group having from 6 to about 10 carbon atoms, and n is a number from zero to about six) with a diamine in an organic solvent. Preferably, the diamine is an organic or organometallic-bridged diamine. More preferably, the diamine has the formula

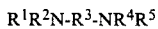

$$R^1R^2N\text{-}R^3\text{-}NR^4R^5$$

where $R^1$, $R^2$, $R^4$ and $R^5$ are H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted lower aryl group having from 6 to about 10 carbon atoms, or a di- or triorganosilyl. $R^1$, $R^2$, $R^4$ and $R^5$ can be the same or different. Preferably, $R^1$ and $R^2$ are the same, and $R^4$ and $R^5$ are the same. More preferably when $R^1$ or $R^2$ is H the other is also H, and when $R^4$ or $R^5$ is H the other is also H. $R^3$, the difunctional bridging group is a lower alkylene group having from 1 to about 8 carbon atoms, a substituted or unsubstituted cycloalkylene group having from 3 to about 8 carbon atoms, a substituted or unsubstituted lower alkenylene group having from 2 to about 8 carbon atoms, a substituted or unsubstituted lower arylene group having from 6 to about 10 carbon atoms, a substituted or unsubstituted polyarylene group, a heteroatom-containing (e.g., O, N, Si, metal) alkylene, cycloalkylene, alkenylene or arylene group. $R^3$ also may be absent, in which case $R^1R^2N\text{-}NR^4R^5$ would be hydrazine and its derivatives.

We have also discovered that Lewis base adducts of decaborane of the formula

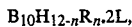
$$B_{10}H_{12-n}R_n\cdot 2L,$$

where R and n are as defined above and L is any neutral Lewis base, can be used as binders for ceramic powders. Preferably, the ceramic powders are aluminum-, boron-, hafnium-, silicon- tantalum-, titanium-, tungsten and zirconium-based ceramic powders. More preferably, the ceramic powders are boron carbide, silicon carbide, silicon nitride, silicon oxynitride, boron nitride, and boron phosphide. The Lewis base adducts include the above-mentioned preceramic polymers, as well as the monomeric adducts.

The Lewis base adducts can also be used as precursors in forming shaped ceramic bodies. However, the use of polymers containing repeat units having the formula $[B_{10}H_{12-n}R_n\cdot L\sim L]_x$ where x is an integer 1 or greater, and R and n are as described above and $L\sim L$ means that there are two Lewis base sites in the molecule, are preferred. The polymer can contain the same repeat units, or they can contain mixtures of repeat units, i.e., $[B_{10}H_{12-n}R_n\cdot L\sim L]_x$ and $[B_{10}H_{12-n'}R'_{n'}\cdot L'\sim L']_{x'}$.

More preferably the polymer used as a precursor for the shaped body contains repeat units of either $[B_{10}H_{12}\cdot Ph_2PCH_2CH_2PPh_2]_x$ or $[B_{10}H_{12}\cdot Ph_2POPPh_2]_x$ where Ph is a phenyl group. Most preferably, the polymer contains repeat units of $[B_{10}H_{12}\cdot Ph_2POPPh_2]_x$.

DETAILED DESCRIPTION OF THE INVENTION

Figure 1:
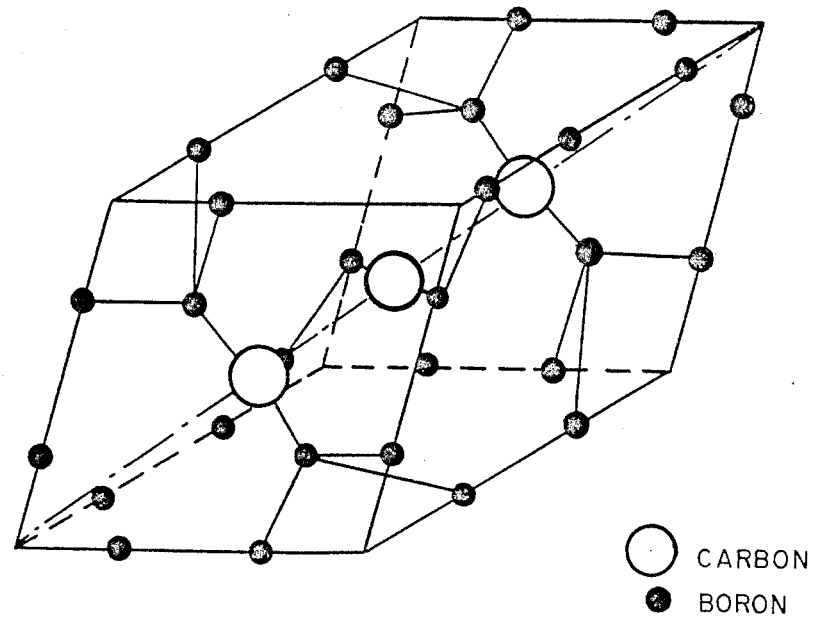
FIG. 1 is a drawing showing the structure of $B_4C$.
Figure 2:
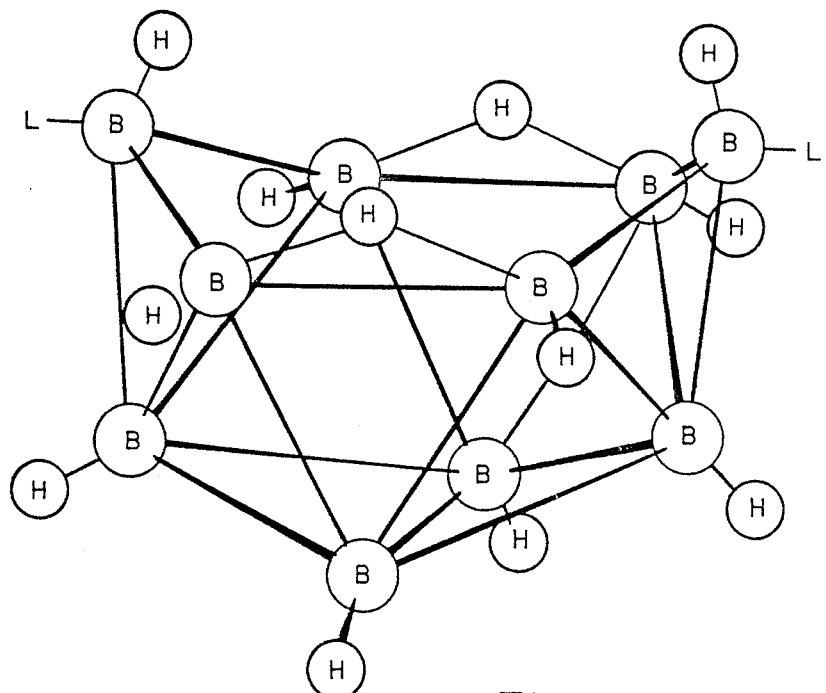
FIG. 2 is a drawing showing the structure of $B_{10}H_{12-n}R_n\cdot 2L$ complexes (where n=0).

We have now discovered that reacting decaborane compounds of the formula

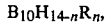
$$B_{10}H_{14-n}R_n,$$

wherein R is a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, or a substituted or unsubstituted lower aryl group having from 6 to about 10 carbon atoms, n is a number from 0 to about 6, with a diamine, preferably an organic or organometallic-bridged diamine, in an organic solvent results in soluble preceramic polymers that have many applications. These preceramic polymers typically will provide a ceramic material in a high yield (typically greater than 60%) upon pyrolysis. These yields are desired to minimize shrinkage on pyrolysis and the destructive effect of evolved volatiles on the molecular microstructure. Further, this preceramic polymer is a processible precursor, i.e., one that is soluble in organic solvents and-/or fusible. The preceramic polymers disclosed herein are soluble in polar organic solvents such as dimethyl sulfoxide (DMSO), dimethylformamide (DMF), acetonitrile, acetone and hexamethylphosphortriamide (HMPA).

The diamine can be virtually any diamine known. Preferably, the diamine has the formula:

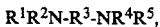
$$R^1R^2N\text{-}R^3\text{-}NR^4R^5,$$

wherein $R^1$, $R^2$, $R^4$ and $R^5$ are H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted lower aryl group having from 6 to about 10 carbon atoms, or a di- or triorganosilyl group. $R^1$, $R^2$, $R^4$ and $R^5$ can be the same or different. Preferably, $R^1$ and $R^2$ are the same, and $R^4$ and $R^5$ are the same. More preferably when $R^1$ or $R^2$ is H, the other is also H. Similarly, it is more preferable when $R^4$ or $R^5$ is H, that the other is also H. Preferably, $R^1$, $R^2$, $R^4$ and $R^5$ are not all ethyl or methyl. More preferably at least one of the groups of $R^1$ and $R^2$ and $R^4$ and $R^5$ are H. Still more preferably all of $R^1$, $R^2$, $R^4$ and $R^5$ are H.

The bridging $R^3$ is a lower alkylene group, having from 1 to about 8 carbon atoms, a substituted or unsubstituted cycloalkylene group having from 3 to about 8 carbon atoms, a substituted or unsubstituted lower alkenylene group having from 2 to about 8 carbon atoms, a substituted or unsubstituted lower arylene group having from 6 to about 10 carbon atoms, a substituted or unsubstituted polyarylene group, a heteroatom-containing (e.g., O, N, Si, metal, etc.) alkylene, cycloalkylene, alkenylene or arylene group. The polyarylene group include naphthylene, anthracenylene, and similar groups well known to the person of ordinary skill in the art. Preferably, it contains less than about 24 carbon atoms. $R^3$ also may be absent, in which case $R^1R^2N\text{-}NR^4R^5$ would be hydrazine and its derivatives. Preferably, $R^3$ is present. $R^3$ is preferably an alkylene group or a substituted or unsubstituted alkenylene group. When $R^3$ is a heteroatom-containing group, the heteroatom is preferably O, N, or Si.

For example, the diamine can be $H_2NCH_2CH_2NH_2$, $CH_3NHCH_2CH_2NHCH_3$, $(CH_3)_2NCH_2CH_2NH_2$, $(CH_3)_2NCH_2CH_2NHCH_3$ and $(CH_3)_2NCH_2CH_2N(CH_3)_2$. These materials can be reacted with the decaborane of the formula $B_{10}H_{14-n}R_n$ in any organic solvent in which they are soluble, for example, diethyl ether, tetrahydrofuran (THF), hexane, toluene, etc. The decaborane and the diamine are allowed to remain in solution for a time sufficient for them to react to form the preceramic polymer. Preferably, the solution is stirred by a means well known to a person of ordinary skill in the art. The temperature and time allowed for reaction will vary depending upon the particular reactants used and the reaction solvent, and can be determined empirically based upon the present disclosure.

The temperature used is preferably below about 165° C. More preferably, it is below about 110° C. Still more preferably, the reaction temperature is below about 80° C. More preferably still the temperature is below about 66° C. Even more preferably, the temperature is below about 35° C. For ease of operation, the most preferable temperatures are ambient temperatures, i.e., between about 22°–28° C. Further, depending upon the solvent used, temperatures substantially below 0° C. can also be used. When heated to temperatures above 60° C., the preceramic polymers produced begin to lose their soluble nature, when heating is continued for long periods of time such as 2-3 hours. Although not wishing to be found by theory, it is believed that this is a result of cross-linking of polymer chains. Thus, in preparing these preceramic polymers, care should be taken to prevent extensive thermal cross-linking, which could result in an insoluble polymer of a different composition and structure. We have found that the preceramic polymers obtained by the above process are soluble. Thus, the preceramic polymers obtained by the present process differ from the polymer claimed to contain repeat units of $[B_{10}H_{12}.Y_2NCH_2CH_2NY_2]_x$ where Y=methyl or ethyl, and x is an integer, described by Cragg et al., J. Chem. Soc. A. (1970) 1817, because those polymers were reported to be insoluble.

The amount of decaborane to diamine that is added to the solvent can vary over a wide range. This amount can be empirically determined by the person or ordinary skill in the art, based upon the present disclosure. Preferably, the decaborane is added to the diamine in a molar ratio ranging from 20:1 to 1:20, more preferably, it is added in an amount ranging from about 2:1 to 1:2 mole ratio and most preferably, it is added in an amount of about 1 to 1 mole ratio. When these polymers are prepared in an organic solvent, such as ether or THF, the resultant preceramic polymer is isolated as a soluble solvate, for example, a polymer containing repeat units of $\{[B_{10}H_{12}.(R^1R^2N-R^3-NR^4R^5)][Et_2O]_m\}_x$ where m is a positive number that may be less than 1. For example, when ethylenediamine is used, one obtains a soluble ether solvate containing repeat units of $\{[B_{10}H_{12}.H_2NCH_2CH_2NH_2][Et_2O]_{0.15})\}_x$. Removal of the ether by heating at 140° C./$10^{-4}$ mm Hg gave material of reduced solubility. Solvent-free preceramic polymers can be obtained from organic solvents such as toluene or hexane.

The methods described herein generally result in the formation of soluble preceramic polymers in high yields. Pyrolysis of these polymers to temperatures greater than 850° C., more preferably, greater than 1000° C. results in a ceramic material. Preferably, the pyrolysis is carried out under an inert gas, such as argon or nitrogen. However, depending upon the particular diamine used, pyrolysis under a reactive gas, such as ammonia, may be desirable. This can readily be determined by the person of ordinary skill in the art based upon the present disclosure. For example, pyrolysis of the diamine where $R^1$, $R^2$, $R^4$ and $R^5$ is H, an alkyl group or a alkenyl group and $R^3$ is an alkylene or alkenylene group, under ammonia will typically result in a ceramic containing boron nitride.

For example, pyrolysis of the ether solvate of the ethylenediamine adduct polymer, $\{[B_{10}H_{12}.H_2NCH_2CH_2NH_2][Et_2O])_{0.15}\}_x$, to 1000° C. under a stream of argon left a reddish-brown powder in 83% ceramic yield. Its composition (analyzed for C, B, and N) is rationalixed in terms of a composition having the formula $(B_4C)_1(BN)_1(C)_{0.19}$. Heating this ceramic material to 1500° C. resulted in a weight loss of 6.8% and left a ceramic residue that contained an excess of free boron, having the composition, $(B_4C)_1(BN)_1(B)_{1.43}$. Preparations of other ether solvated polymers are given below: $[B_{10}H_{12}.Me_2NCH_2CH_2NMe_2]_x$ (ceramic yield on pyrolysis to 1000° C. under argon: 80%; $(B_4C)_1(BN)_1(C)_{0.53}$; further heating to 1500° C.: 7% weight loss, giving $(B_4C)_1(BN)_1(C)_{0.17}$) $[B_{10}H_{12}.Me_2NCH_2CH_2NH_2]_x$ (ceramic yield (1000° C.): 85%) $[B_{10}H_{12}.MeHNCH_2CH_2NHMe]_{0.85}[B_{10}H_{12}.MeHNCH_2CH_2NH_2]0.159_x$ (ceramic yield (1000° C.): 61%) $[B_{10}H_{12}.H_2N(CH_2)_3NH_2]_x$ (ceramic yield (1000° C.): 89%)

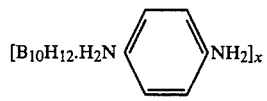

(ceramic yield (1000° C.): 76%) $[B_{10}H_{12}.HN(CH_2CH_2)_2NH]_x$ (ceramic yield (1000° C.): 88%)

These preceramic polymers are soluble in polar organic solvents. Preferably, the polar organic solvent is DMSO, DMF, acetonitrile, acetone or HMPA. Typically, these polymers are not soluble in non-polar solvents, such as benzene, aliphatic hydrocarbons and diethyl ether. Because of their insolubility in benzene, determination of their molecular weight by cryoscopy in benzene was not possible. Vapor pressure osmometry was attempted but proved not to be applicable, which suggests that the molecular weight of these polymers is greater than 50,000.

Additionally, it is possible to prepare preceramic polymers containing mixtures of the decarborane and different diamines. for example, $B_{10}H_{14}$ was reacted in an organic solvent with a 1:1 (molar) mixture of two different diamines, $H_2NCH_2CH_2NH_2$ and $Me_2NCH_2CH_2NMe_2$, resulting in a hybrid polymer containing both diamines. The ceramic yield of this material (heated to 1000° C.) was 73%. In contrast, pyrolysis of a mixture of equal weights of polymers containing repeat units of $[B_{10}H_{12}.H_2NCH_2CH_2NH_2]_x$ and $[B_{10}H_{12}.Me_2NCH_2CH_2NMe_2]_x$ to 1000° C. gave a 93% ceramic yield, establishing that a different polymer was produced. These polymers can preferably be used as binders, in forming shaped bodies, and in forming fibers.

Fibers can be formed by methods that are well known in the art such as melt spinning, dry spinning, etc. In one method, fibers can be pulled from a paste of the preceramic polymer powder in a polar organic solvent. For example, fibers pulled from a paste containing repeat units of $[B_{10}H_{12}.H_2NCH_2CH_2NH_2]_x$ ppolymer powder in DMSO/acetone form a green fiber. This fiber maintained its form and could be pyrolyzed to give ceramic fibers. Scanning electron microscopy (SEM) showed them to have a circular cross section, a smooth surface and no obvious major flaws. They were about 3-4μ in diameter. Ceramic fibers also could be prepared from the hybrid polymer previously mentioned as well as from other above-described preceramic polymers. When the preceramic polymer contained repeat units of $[B_{10}H_{12}.MeHNCH_2CH_2NHMe]_{0.85}$ the fiber was made by melting the ceramic material.

These polymers can also be used with ceramic materials, such as, boron carbide, boron nitride, boron phosphides, boron silicides, aluminum boride, silicon carbide, silicon nitride and silicon oxynitride as a binder.

We have also discovered, in addition to these preceramic polymers, other Lewis base adducts of decaborane having the formula $B_{10}H_{12-n}R_n.2L$, wherein R and n are as defined previously and L is any neutral Lewis base, can also be used as binders for ceramic powders. Such compounds can readily be prepared by methods well known in the art. For example, by the reaction at room temperature, in a solvent, of two molar equivalents of the Lewis base and one molar equivalent of the decarborane $B_{10}H_{14-n}R_n$ (Method A) or by a ligand displacement reaction of a $B_{10}H_{12-n}R_n.2L$ compound with a second ligand (Method B). Other procedures such as Lewis base modification in the $b_{10}H_{12-n}R_n.2L$ adduct by appropriate nucleophilic substitution reactions at the Lewis base portion of the adduct can also be used, for example, introducing new substituents on phosphorus in $B_{10}H_{12}(Ph_2PCl)_2$. Using the applicable procedure discussed above, a number of Lewis base adducts were formed as indicated below:

| Compound |
|---|
| $B_{10}H_{12}((Ph_3P)_2$ |
| $B_{10}H_{12}(Ph_2PH)_2$ |
| $B_{10}H_{12}(Ph_2PCl)_2$ |
| $B_{10}H_{12}(Ph_2POH)_2$ |
| $B_{10}H_{12}(Ph_2PN_3)_2$ |
| $B_{10}H_{12}(Ph_2PNHNH_2)$ |
| $B_{10}H_{12}(Ph_2PNH_2)_2$ |
| $B_{10}H_{12}(Et_2S)_2$ |
| $B_{10}H_{12}(Ph_3As)_2$ |
| $B_{10}H_{12}(CH_3CN)_2$ |
| $B_{10}H_{12}(CH_2=CHCN)_2$ |
| $B_{10}H_{12}(Bu_3P)_2$ |
| $B_{10}H_{12}((Me_2N)_2PCl_2$ |

These adducts are typically soluble in common organic solvents, thermally stable at ambient temperature and generally not adversely affected by oxygen or water, when exposed for short duration, at ambient temperatures.

In addition to the above compounds, various salts of the $[B_{10}H_{10}]^{2-}$ anion prepared by cation metathesis can also be used. For example, cation methathesis with $[Et_3NH]_2[B_{10}H_{10}]$ resulted in the formation of a number of such compounds, for example, $[Ph_4P]_2[B_{10}H_{10}]$, $[Ph_3PMe]_2[B_{10}H_{10}]$, $]Ph_3P(CH_2)_3PPh_3][B_{10}H_{10}]$ and $[Bu_3PMe]_2[B_{10}H_{10}]$.

Pyrolysis of these materials in a Lindberg tube furnace (fused silica boat, quartz tube) under argon to 1000° C. (at 10° C./min) gave the results shown in Table I.

ramic yield upon pyrolysis. Further, Lewis base adducts containing organophosphorus ligands resulted in ceramic residues that contained significant amounts of phosphorus. However, the phosphorus content was virtually eliminated by heating the ceramic futher to about 1500° C.

The monomers, polymers containing repeat units of the above-described monomers and polymers containing mixtures of repeat units of the above-described monomers are excellent binders for ceramic materials. Such polymer binder/powder compositions were prepared by variety of methods well known to the person of ordinary skill in the art. The binder is mixed with the ceramic powder to form an intimate mixture. In one method, such compositions were prepared by mixing the ceramic powder and the decaborane Lewis base adduct as a physical mixture in the absence of a solvent, for example, by 15 minutes of grinding in a mortar and pestle. Another method of preparation involved ultrasonication of a suspension of the ceramic powder in a solution of the decaborane Lewis base adduct compound followed by evaporation of the organic solvent. A third procedure involved ultrasonication of a mixture of the two compounds in a liquid diluent in which the Lewis base adduct of decaborane was not soluble, followed by evaporation of the diluent. By these methods the ceramic powder particles are coated with a film of the binder. The powder/binder mixture thus obtained could then be shaped depending upon the desired use. For example, the mixture could be uniaxially pressed into bars using standard techniques. For example, it could be pressed into bars at 5000 lbs and then further pressed isostatically (50 Kpsi). Subsequently, these bars are heated in a stream of an inert gas such as argon to a temperature above about 850° C., preferably to at least about 1000° C. For example, a bar prepared from 0.5 grams of $B_{10}H_{12}(Ph_3P)_2$ and 2.50 grams of $B_4C$ powder using the physical mixture procedure after pyrolysis under argon heated to 1000° C. at 10° C./min gave a uniform black bar that had retained its shape in all dimensions without undergoing significant shrinkage or bloating. The bar demonstrated excellent strength.

TABLE 1

Pyrolysis of $B_{10}H_{12}.2L$ Adducts

| | Compound | Ceramic Yield, %[a] | Ceramic Composition, % | | | | | |
|---|---|---|---|---|---|---|---|---|
| 1. | $B_{10}H_{12}(Ph_2PH)_2$ | 83 | B, | 23.17; | C, | 60.75 | P, | 13.71 |
| 2. | $B_{10}H_{12}(Ph_3P)_2$ | 86 | B, | 18.20; | C, | 69.59; | P, | 9.88 |
| 3. | $B_{10}H_{12}(Ph_2PCl)_2$ | 73 | B, | 20.62; | C, | 57.09; | P, | 13.17 |
| | | | | | Cl, | 0.02 | | |
| 4. | $B_{10}H_{12}(Ph_2POH)_2$ | 77 | B, | 21.38; | C, | 55.65; | P, | 11.93; |
| | | | | | O, | 10.57 | | |
| 5. | $B_{10}H_{12}(Ph_2PN_3)_2$ | 72 | | | | | | |
| 6. | $B_{10}H_{12}(Ph_2PNHNH_2)_2$ | 71 | B, | 27.69; | C, | 43.80; | P, | 8.20; |
| | | | | | N, | 16.56 | | |
| 7. | $B_{10}H_{12}(Bu_3P)_2$ | 58 | B, | 35.94; | C, | 46.34; | P, | 35.94 |
| 8. | $B_{10}H_{12}(Me_2N)_2PCl)_2$ | 55 | | | | | | |
| 9. | $B_{10}H_{12}(Ph_3As)_2$ | 83 | B, | 31.90; | C, | 61.09; | As, | <0.50 |
| 10. | $B_{10}H_{12}(Et_2S)_2$ | 34 | B, | 68.12; | C, | 9.39; | S, | 10.91 |
| 11. | $B_{10}H_{12}(CH_3CN)_2$ | 58 | B, | 80.87; | C, | 7.64; | N, | 5.58 |
| 12. | $B_{10}H_{12}(CH_2=CHCN)_2$ | 96 | | | | | | |
| 13. | $[Ph_3PMe]_2[B_{10}H_{10}]$ | 83 | | | | | | |
| 14. | $[Ph_4P]_2[B_{10}H_{10}]$ | 93 | B, | 6.87;. | C, | 73.06; | P, | 13.01 |
| 15. | $[Ph_3P(CH_2)_3PPh_3]$— $[B_{10}H_{10}]$ | 91 | B, | 15.96; | C, | 69.33; | P, | 8.33 |
| 16. | $[Bu_3PMe]_2[B_{10}H_{10}]$ | 68 | B, | 30.10; | C, | 49.03; | P, | 11.96 |

[a]Pyrolysis to 1000° C. under argon.

Ceramic yield = $\frac{\text{wt. residue}}{\text{wt. sample pyrolyzed}} \times 100$ The results indicate that these decaborane-Lewis base adducts and $[B_{10}H_{10}]^{2-}$ salts give a wide range of ce- The amount of ceramic powder to Lewis base adduct used as binder can vary widely. One can use ceramic to binder in ratios ranging from 99 to 1 to about 1:1. Preferably, one uses the ceramic to Lewis base adduct of decaborane in amounts ranging from about 95:5 to about 75:25 weight ratio. More preferably, it ranges from about 80:20 to about 90:10 weight ratio. One preferred embodiment involves mixing about 83.3 to 16.7 parts by weight of ceramic to binder. We have found that one can use monomers of the decaborane Lewis base adducts as well as polymers and obtain excellent results. Preferably, the ceramic material includes aluminum-based, boron-based such as boron carbide, boron nitride, boron phosphide, boron silicide and aluminum boride, hafnium-based, silicon-based such as silicon carbide, silicon nitride, or silicon oxynitride, tungsten-based, tantalum-based, titanium-based, or zirconium-based materials. More preferably, it is boron carbide, boron phosphide, boron nitride, silicon nitride, and silicon carbide. Most preferably, it is boron carbide. Preferred adducts included the following complexes: $[B_{10}H_{12}(Ph_2PH)_2]$, $[B_{10}H_{12}(Ph_2PCl)_2]$, $[B_{10}H_{12}(Ph_2PNHNH_2)_2]$, $[B_{10}H_{12}(Ph_3P)_2]$ and polymers having a diamine or a diphosphosphine as the difunctional Lewis base. More preferably, one uses a polymer containing repeat units of $[B_{10}H_{12}.Ph_2POPPh_2]_x$.

The above-described monomers and polymers can also be used for the production of shaped ceramic bodies. However, the use of polymers is much preferred over monomers. Preferably, the polymeric decaborane Lewis base adducts have a diamine or a diphosphine as the difunctional Lewis base.

The polymers are then shaped as desired and pyrolyzed to a ceramic material. Pyrolysis is preferably above at least about 850° C., more preferably, above at least 1000° C. Pyrolysis is typically carried out under an inert atmosphere. For example, pyrolysis of the following phosphorus-containing compounds under argon to 1000° C. gave black ceramic residues as follows: $[B_{10}H_{12}.Ph_2PCH_2CH_2PPh_2]_x$, 92% ceramic yield; analysis B, 22.52; C, 45.78; P, 11.25% $[B_{10}H_{12}.Ph_2PCPPh_2]_x$, 69% ceramic yield, analysis: B, 20.05; C, 59.15; P, 14.59% $[B_{10}H_{12}.Ph_2P-N=PPh_2CH_2CH_2PPh_2=N-PPh_2]_x$, 52% ceramic yield; analysis: B, 22.75; C, 56.31; P, 12.46; N, 0.14% $[B_{10}H_{12}.Ph_2POPPh_2]_x$, 93% ceramic yield; analysis: B, 25.30; C, 52.01; P, 8.69; O, 12.05% Heating the latter 1000° C. ceramic product to 1500° C. under argon resulted in a 20% weight loss (including almost all of the phosphorus): analysis: B, 28.90; C, 60.21; P, 0.39; O, 2.88%. $[B_{10}H_{12}.Ph_2PNHNHPPh_2]_x$, 57% ceramic yield.

The use of polymers containing repeat units of $[B_{10}H_{12}.Ph_2PCH_2CH_2PPh_2]_x$ and $[B_{10}H_{12}.Ph_2POPPh_2]_x$ is preferable. The polymer containing repeat units of $[B_{10}H_{12}.Ph_2POPPh_2]_x$ (the "POP" polymer) was most preferable in the formation of shaped bodies. Heating this polymer to 1000° C. under an inert atmosphere resulted in a 93% ceramic yield which upon further heating to 1500° C. under argon resulted in a 20% weight loss including almost all of the phosphorus. Pressing a bar from this polymer and then pyrolyzing it by standard techniques as described above resulted in a ceramic bar having a tensile strength that was greater than 10,000 psi (standard ball-in-the-ring test). The properties of this ceramic were unexpectedly better than those of the other analogous phosphorus containing polymers. This POP polymer was also an excellent binder.

The invention will be further illustrated by the examples that follow.

A. General Comments

All manipulations were done in an inert atmosphere (argon or nitrogen) following standard techniques. All solvents were distilled from appropriate drying agents under a nitrogen atmosphere prior to use. All reagents used were available from common suppliers and were used as received. All new compounds were fully characterized by spectroscopic (multinuclear NMR and IR) and analytical data. All compounds had NMR resonances ($^{11}B$, $^{13}C$, $^{1}H$, $^{31}P$) and IR absorptions that were consistent with their formulated structures. Ceramic analyses were obtained from Galbraith Laboratories, Knoxville, Tenn., and C, H, N analyses on non-ceramic materials were obtained from Scandinavian Microanalytical Laboratory, Herlev, Denmark.

NMR measurements were obtained using a Varian XL300 NMR spectrometer. IR measurements were obtained on a Perkin-Elmer Model 1430 spectrometer. TMA and TGA measurements were obtained on a Perkin-Elmer TGS equipped with a Thermal Analysis System 4 controller. Lindberg tube furnaces with Eurotherm controllers were used for all bulk pyrolyses. For pyrolyses to 1000° C., 1½" quartz tubes and fused silica boats were used for all samples (bars, fibers and bulk); for ones to 1500° C., 2½" mullite tubes and boron nitride boats supported on alumina "dee" tubes were used. Pyrolyses were done under a flowing argon atmosphere, for runs to 1000° C. the flow rate was ca. 6–8 1/hr, for runs to 1500° C. it was ca. 16–20 1/hr.

A stainless steel die was used for forming 1½"×½" bars. A Carver laboratory press was used for uniaxial bar pressing. Isostatic bar pressing was done in a pneumatically driven oil press with the bars contained in evacuated, sealed rubber bags. SEM photographs were obtained on an International Science Instruments DS-130 instrument. X-ray powder diffaction spectroscopy was obtained on a Charles Supper detector and Diano generator instrument.

B. Preparation of Lewis Base Adducts of Decaboranes

1. Preparation of $[B_{10}H_{12}(Ph_3P)_2]$

A 250 ml Schlenk flask equipped with a stir-bar, gas inlet tube and a septum was charged (under argon) with 5.0 g (41 mmol) of $B_{10}H_{14}$, 35 ml of diethyl ether and a solution of 25.0 g (95 mmol) of $Ph_3P$ in 150 ml of $Et_2O$ (with vigorous stirring during and for 5 minutes after the addition). The precipitate which had formed was filtered, washed with $Et_2O$ and dried at 100° C./0.1 mm Hg. The product, a white solid, 25.01 g (97%), had a mp>250° C., ceramic yield (to 950° C., by TGA) 85%.

The complexes where L=$Ph_2PH$, $Ph_2PCl$, $Bu_3P$, $(Me_2N)_2PCl$, $Ph_3As$, $Et_2S$, $CH_3CN$, and $CH_2=CHCN$ were prepared by this general procedure. Those where L=$Ph_2POH$, $Ph_2PN_3$, $Ph_2PNHNH_2$ and $Ph_2PNH_2$ were prepared by the method described in Schroeder, H et. al., Inorg. CHem., 1:618 (1962).

The results of their pyrolysis (i.e., their ceramic yield) are given in Table I.

2. Preparation of $[Ph_4P]_2[B_{10}H_{10}]$

A solution of 2.00 g $[Et_3NH]_2[B_{10}H_{10}]$ (6.2 mmol) in 30 ml 9/1 water/ethanol was added to a solution of

[Ph4P][Br] (6.00 g, 14.3 mmol) in 50 ml of the same solvent mixture, in a 125 ml Erlenmeyer flask. After the mixture had been stirred for 5 minutes, the precipitate was filtered, washed with water, 5 ml of cold (ca. −10° C.) acetone and, finally, with ether. Drying at 60° C./0.1 mm Hg for 5 hours gave a white solid, 4.78 g (96%), mp>225° C., ceramic yield (to 950° C., by TGA) 93%.

The following salts were all prepared by the above general metathesis route: [Ph$_3$PMe]$_2$[B$_{10}$H$_{10}$], [Bu$_3$PMe]$_2$[B$_{10}$H$_{10}$] and [Ph$_3$PCH$_2$CH$_2$CH$_2$PPh$_3$][B$_{10}$H$_{10}$].

3. Preparation of [B$_{10}$H$_{12}$.Ph$_2$PCH$_2$CH$_2$PPh$_2$]$_x$

To a solution of 300 mg (2.45 mmol) of B$_{10}$H$_{14}$ in 50 ml of Et$_2$O (at 0° C. under nitrogen) was added with stirring a solution of 1.0 g (12.5 mmol) of Ph$_2$PCH$_2$CH$_2$PPh$_2$ in 50 ml of toluene. The reaction mixture was allowed to warm to room temperature and stirred for 20 hours. During this time a precipitate formed which was filtered. It was dissolved in acetone and reprecipitated by adding Et$_2$O. Typical yields were 0.60–0.80 g (46–62%) of a white solid, with mp>230° C.

A similar procedure was used in the preparation of [B$_{10}$H$_{12}$.Ph$_2$PC≡CPPh$_2$]$_x$, mp 160°–168° C. (dec.) Anal. Calcd: C, 67.25; H, 5.87. Found: C, 67.24; H, 5.79.

4. Preparation of [B$_{10}$H$_{12}$.Ph$_2$PNHNHPPh$_2$]$_x$

To a suspension of 2.03 g (3.6 mmol) of B$_{10}$H$_{12}$(Ph$_2$PCl)$_2$ and 2.00 g (3.6 mmol) of B$_{10}$H$_{12}$(Ph$_2$PNHNH$_2$)$_2$ in 200 ml of acetone was added with stirring, under nitrogen, 10 ml of Et$_3$N over a period of 2–3 minutes at room temperature. The solution became clear and within about 5 minutes a fine white precipitation appeared. After 2 hours, the mixture was filtered. The acetone filtrate was evaporated to dryness to leave 4.55 g of light yellow powder. Recrystallization from acetone/diethyl ether gave 3.25 g of white crystals, mp 176°–178° C. (dec. with gas evolution).

5. Preparation of [(B$_{10}$H$_{12}$)$_a$(CH$_2$CHCN)$_b$]

The polyacrylonitrile (PAN) was purchased from Aldrich Chemical Co. It was soluble in DMF at 60° C.

A mixture of 5.00 g (41 mmol) of B$_{10}$H$_{14}$, 4.34 g (82 mmol) of PAN and 150 ml of DMF was stirred and heated at 60° C. under nitrogen for 1 day. Some gas evolution occurred during the first 30 minutes and the initially colorless solution became pale orange. The precipitate which formed was filtered and the filtrate was evaporated in vacuum. The residue was extracted with two 100 ml portions of pentane, which served to remove 1.2 g of unreacted B$_{10}$H$_{14}$. The pentane-insoluble, warm DMF-soluble product (2.69 g of white powder, mp>300° C.) gave a ceramic yield of 61% on pyrolysis to 1000° C. under argon (vs 0% for PAN).

6. Preparation of [B$_{10}$H$_{12}$.H$_2$NCH$_2$CH$_2$NH$_2$]$_x$

A 250 ml Schlenk flask equipped with a nitrogen inlet and a rubber septum was charged with 5.0 g (41 mmol) of B$_{10}$H$_{14}$ in 150 ml of Et$_2$O. The resulting solution was cooled to 0° C. and 2.4 g (40 mmol) of ethylenediamine, H$_2$NCH$_2$CH$_2$NH$_2$, was added dropwise with stirring (under nitrogen). A white precipitate formed immediately. The reaction mixture was stirred at room temperature for 3 hours and then was filtered. The white solid thus isolated was dried at 60° C. at 0.001 mm Hg for 18 hours. After this treatment it still contained some Et$_2$O as evidenced by the $^1$H NMR spectrum of a sample dissolved in DMSO-d$_6$, and even drying at 100° C. at 0.0001 mm Hg failed to remove the Et$_2$O. On the basis of its analysis (Found; C, 16.35; H, 11.88%) the solid may be formulated approximately as [B$_{10}$H$_{12}$.H$_2$NCH$_2$CH$_2$NH$_2$][Et$_2$O]$_{0.15}$ (Calcd: C, 16.31; H, 11.34%). The product is soluble in polar solvents such as DMSO, DMF, HMPA and acetone. It is insoluble in aliphatic hydrocarbons and benzene.

The ether of solvation could be removed by heating the sample at 140° C. at 0.0001 mm Hg for 3 hours. The material thus obtained had a much lower solubility in acetone than the ether solvate. (Anal. Found: C, 13.98; H, 11.28; N, 16.48%. Calcd for [B$_{10}$H$_{12}$.H$_2$NCH$_2$CH$_2$NH$_2$]$_x$: C, 13.32; H, 11.88; N, 15.54%).

7. Preparation of [B$_{10}$H$_{12}$.Me$_2$NCH$_2$CH$_2$NMe$_2$]$_x$

A similar reaction of 41 mmol of B$_{10}$H$_{14}$ and 4.7 g (40 mmol) of Me$_2$NCH$_2$CH$_2$NMe$_2$ in 150 ml of Et$_2$O gave the Et$_2$O solvate (by $^1$H NMR) in nearly quantitative yield, mp 246°–250° C.

Similar procedures using the respective diamines gave the following soluble (in polar solvents) Et$_2$O-solvated polymers: [B$_{10}$H$_{12}$.Me$_2$NCH$_2$CH$_2$NH$_2$]$_x$ [B$_{10}$H$_{12}$.H$_2$N(CH$_2$)$_3$NH$_2$]$_x$

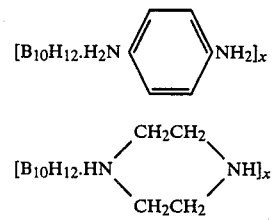

[B$_{10}$H$_{12}$.HN⟨CH$_2$CH$_2$/CH$_2$CH$_2$⟩NH]$_x$

A commercial mixture containing 85% MeHNCH$_2$CH$_2$NHMe and 15% MeHNCH$_2$CH$_2$NH$_2$ gave a hybrid polymer, [B$_{10}$H$_{12}$.MeHNCH$_2$CH$_2$NHMe]$_{0.85}$(B$_{10}$H$_{12}$.MeHNCH$_2$CH$_2$-NH$_2$)$_{0.15}$]$_x$.

Similar procedures using toluene, hexane or THF as the reaction solvent all gave high yields of soluble (in polar solvents) polymers. By $^1$H NMR the THF preparation contained solvent after drying at 40° C. at 0.001 mm Hg for 18 hours. The toluene and hexane preparations were judged to be solvent-free, based on the absence of observable $^1$H NMR resonances attributable to the solvent.

C. Preparation of Ceramic Bars from Pure [B$_{10}$H$_{12}$.L-L]$_x$Polymers

The procedure used with [B$_{10}$H$_{12}$.Ph$_2$POPPh$_2$]$_x$ is described as an example.

A 3.0 g sample of the polymer was finely powdered in a mortar and pestle (inert atmosphere box) and then placed in a ½"×1½" rectangular die. Uniaxial pressing in a Carver press to 5,000 pounds (5 minutes) was followed by ambient temperature isostatic pressing to 50,000 psi (15 minutes). The polymer bar thus obtained had the approximate dimensions ½"×1½"×¼".

The bar was introduced into a fused silica pyrolysis boat which then was inserted into a quartz tube that had been flushed with argon for 15 minutes. The end of the quartz tube was connected to an oil bubbler. After ca. 5 minutes, the argon flow was reduced from ca. 100 ml/min to about 20–30 ml/min, and the quartz tube was placed in a Lindberg tube furnance and heated at a rate of 10° C./min to a temperature of 850° C. After it had cooled to room temperature, the bar was examined: no detectable shrinkage or bloating had occurred. Heating then was continued to 1000° C. This resulted in about 15% shrinkage (length and width). The black ceramic bar thus produced had a tensile strength of greater than 10,000 psi (ball-in-the-ring test).

It may be noted that all ceramic materials obtained by pyrolysis to 1000° C. were amorphous. Heating to 1500° C. in most (but not all) cases formed X-ray diffraction-detectable $B_4C$.

D. Preparation of Ceramic Composite Bars using $B_{10}H_{12}.2L$ Complexes as Binders Three procedures were used for sample preparation:
A. Weighed quantities of monomeric $B_{10}H_{12}.2L$ and the ceramic powder indicated in Table 2 were mixed and ground for 15 minutes in a mortar and pestle.
B. The $B_{10}H_{12}.2L$ (0.5 g) was dissolved in 50 ml of a solvent (usually acetone) and 2.5 g of ceramic powder indicated in Table 2 added. The stoppered flask was ultrasonicated by standard techniques for 15 minutes. Afterwards, the solvent was removed by standard methods at 100° C. and 0.1 mm Hg.
C. The $B_{10}H_{12}.2L$ (0.5 g) and the ceramic powder (2.5 g) indicated in Table 2 were suspended in a nonsolvent, usually pentane. Further processing was as in B above.

The samples thus prepared were placed in a $\frac{1}{2}'' \times 1\frac{1}{2}''$ rectangular die and pressed in a Carver press to 5,000 pounds uniaxially (6,667 psi), removed to an ambient temperature isostatic press and further pressed to 50 K psi. The uniaxial pressing time duration was about 5 minutes and the isostatic pressing time duration was about 15 minutes. The resulting bar was pyrolyzed in a stream of argon to 1000° C. (10° C. per minute heating rate, held at 1000° C. for 30 minutes). The pyrolyzed sample was handled in an inert atmosphere box. The results of the individual experiments are given in Table 2.

A ceramic bar is considered to be "excellent" if it is a uniform, black rectangular bond that has retained its shape (vs. the bar before pyrolysis) in all three dimensions without undergoing any discernable shrinkage or bloating above the detectable level of 3-5% and if its strength is such that it cannot be broken manually without the aid of mechanical means (e.g., vise and pliers).

The data in Table 3 were obtained similarly, but different weight ratios of binder to ceramic powder were used. It appears that the 0.167 weight fraction of binder used (0.5/0.5+2.5) in the Table 2 experiments gives better results.

Such bars also were prepared using $B_4C$ powder and $[B_{10}H_{12}.L—L]_x$ polymers as binders, specifically with: $[B_{10}H_{12}.Ph_2POPPh_2]_x$: "excellent" binder; $[B_{10}H_{12}.Ph_2P—N=PPh_2—CH_2CH_2—PPh_2=N—PPh_2]_x$: "excellent" binder; and $[B_{10}H_{12}.Me_2NCH_2CH_2NMe_2]_x$: "excellent" binder.

TABLE 2

| $B_{10}H_{12} \cdot 2L$ Binder Experiments (0.167 weight fraction binder) | | | | |
|---|---|---|---|---|
| $B_{10}H_{12} \cdot 2L$ | Ceramic Powder | Mixture Method$_a$ | Color | Shape Retention |
| $B_{10}H_{12}—[(C_6H_5)_2PH]_2$ | $B_4C$ | A | Black | Excellent |
| $B_{10}H_{12}—[(C_6H_5)_2PCl]_2$ | $B_4C$ | A | Black | Excellent |
| $B_{10}H_{12}[(C_6H_5)_2$ | | | | |

TABLE 2-continued

| $B_{10}H_{12} \cdot 2L$ Binder Experiments (0.167 weight fraction binder) | | | | |
|---|---|---|---|---|
| $B_{10}H_{12} \cdot 2L$ | Ceramic Powder | Mixture Method$_a$ | Color | Shape Retention |
| $PNHNH_2]_2$ | $B_4C$ | A | Black | Satisfactory |
| $B_{10}H_{12}—[(C_6H_5)_2POH]_2$ | $B_4C$ | A | Black | Good |
| $B_{10}H_{12}—[(C_6H_5)_2PN_3]_2$ | $B_4C$ | A | Black | Satisfactory |
| $B_{10}H_{12}(CH_3CN)_2$ | $B_4C$ | A | Black | Satisfactory |
| $B_{10}H_{12}[(C_2H_5)_2—S]_2$ | $B_4C$ | A | Black | Good |
| $B_{10}H_{12}\{[(CH_3)_2—N]_2PCl\}_2$ | $B_4C$ | A | Black | Fair |
| $B_{10}H_{12}—[(C_4H_9)_3P]_2$ | $B_4C$ | B (pentane) | Black | Good |
| $B_{10}H_{12}—[(C_6H_5)_3As]_2$ | $B_4C$ | B (pentane) | Black | Good |
| $B_{10}H_{12}—[(C_6H_5)_3P]_2$ | $B_4C$ | B (acetone) | Black | Excellent |
| $B_{10}H_{12}—[(C_6H_5)_3P]_2$ | $B_4C$ | C (pentane) | Black | Excellent |
| $B_{10}H_{12}—[(C_6H_5)_2PH]_2$ | $B_4C$ | B (acetone) | Black | Excellent |
| $B_{10}H_{12}—[C_6H_5)_2PH]_2$ | $B_4C$ | C (pentane) | Black | Excellent |
| $B_{10}H_{12}—[(C_6H_5)_2PH]_2$ | B | A | Dk. Red | Excellent |
| $B_{10}H_{12}—[(C_6H_5)_3P]_2$ | $Si_3N_4$ | A | Gray | Excellent |
| $B_{10}H_{12}—[(C_6H_5)_3P]_2$ | $\alpha$-SiC | A | Dk. Gray | Good |
| $B_{10}H_{12}—[(C_6H_5)_3P]_2$ | $\beta$-SiC | A | Dk. Gray | Good |
| $B_{10}H_{12}—[(C_6H_5)_3P]_2$ | BN | A | Gray | Satisfactory |
| $B_{10}H_{12}—[(C_6H_5)_3P]_2$ | AlN | A | Silver/Gray | Good |
| $B_{10}H_{12}—[(C_6H_5)_3P]_2$ | BP | A | Gray | Fair |
| $B_{10}H_{12}—[(C_6H_5)_3P]_2$ | $B_{13}P_2$ | A | Dk. Gray | Excellent |
| $B_{10}H_{12}—[(C_6H_5)_3P]_2$ | Rayon | B (acetone) | Black | Good |

$^a$Solvent or diluent used in sample preparation

TABLE 3

| $B_{10}H_{12} \cdot 2L$ Binder Experiments (other weight fractions of binder) | | | | |
|---|---|---|---|---|
| $B_{10}H_{12} \cdot 2L$, #g | Ceramic Powder, #g | Mixture Method | Color | Shape Retention |
| $B_{10}H_{12}[(C_6H_5)_3P]_2$, 3.0 | none | A | Black | Good |
| $B_{10}H_{12}[(C_6H_5)_3P]_2$, 0.1 | $B_4C$, 2.9 | A | Black | Fair |
| $B_{10}H_{12}[(C_6H_5)_3P]_2$, 0.1 | $B_4C$, 2.9 | B (acetone) | Black | Fair |
| $B_{10}H_{12}[(C_6H_5)_3P]_2$, 0.1 | $B_4C$, 2.9 | C (pentane) | Black | Fair |
| $B_{10}H_{12}[(C_6H_5)_3P]_2$, 0.25 | $B_4C$, 2.75 | A | Black | Satisfactory |
| $B_{10}H_{12}[(C_6H_5)_3P]_2$, 0.25 | $B_4C$, 2.75 | B (acetone) | Black | Satisfactory |
| $B_{10}H_{12}[(C_6H_5)_3P]_2$, 0.25 | $B_4C$, 2.75 | C (pentane) | Black | Satisfactory |
| $B_{10}H_{12}[(C_6H_5)_2PH]_2$, 0.1 | $B_4C$, 2.9 | A | Black | Fair |
| $B_{10}H_{12}[(C_6H_5)_2PH]_2$, 0.1 | $B_4C$, 2.9 | B (acetone) | Black | Fair |
| $B_{10}H_{12}[(C_6H_5)_2PH]_2$, 0.1 | $B_4C$, 2.9 | C (pentane) | Black | Fair |
| $B_{10}H_{12}[(C_6H_5)_2PH]_2$, 0.25 | $B_4C$, 2.75 | A | Black | Fair |

TABLE 3-continued $B_{10}H_{12} \cdot 2L$ Binder Experiments (other weight fractions of binder)

| $B_{10}H_{12} \cdot 2L$, #g | Ceramic Powder, #g | Mixture Method | Color | Shape Retention |
|---|---|---|---|---|
| $B_{10}H_{12}[(C_6H_5)_2$—$PH]_2$, 0.25 | $B_4C$, 2.75 | B (acetone) | Black | Fair |
| $B_{10}H_{12}[(C_6H_5)_2$—$PH]_2$, 0.25 | $B_4C$, 2.75 | C (pentane) | Black | Fair |

This invention has been described in detail with reference to the preferred embodiments thererof. However, it will be appreciated that those skilled in the art upon consideration of this disclosure may make modifications and improvements within the scope and spirit of the invention as described in the claims.

We claim:

1. A preceramic polymer soluble in polar organic solvents formed by reacting $B_{10}H_{14-n}R_n$, where R is a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, or a substituted or unsubstituted lower aryl group having from 6 to about 10 carbon atoms, and n is a number from zero to about six, with a diamine in an organic solvent for a sufficient time to form said soluble preceramic polymer.

2. The polymer of claim 1, wherein the diamine has the formula $R^1R^2N$—$R^3$—$NR^4R^5$, where $R^1$, $R^2$, $R^4$ and $R^5$ are H, a lower alkyl group having from 1 to about 8 carbon atoms, a substituted or unsubstituted cycloalkyl group having from 3 to about 8 carbon atoms, a substituted or unsubstituted lower alkenyl group having from 2 to about 8 carbon atoms, a substituted or unsubstituted lower aryl group having from 6 to about 10 carbon atoms, or a di- or triorganosilyl group, $R^1$, $R^2$, $R^4$ and $R^5$ can be the same or different, $R^3$ is a lower alkylene group having from 1 to about 8 carbon atoms, a substituted or unsubstituted cycloalkylene group having from 3 to about 8 carbon atoms, a substituted or unsubstituted lower alkenylene group having from 2 to about 8 carbon atoms, a substituted or unsubstituted lower arylene group having from 6 to about 10 carbon atoms, a substituted or unsubstituted polyarylene group, a heteroatom-containing alkylene group, a heteroatom-containing cycloalkylene group, a heteroatom-containing alkenylene group or a heteroatom-containing arylene group, and $R^3$ may or may not be present.

3. The polymer of claim 2, wherein $R^3$ is present.

4. The polymer of claim 3, wherein $R^1$ and $R^2$ are the same, and $R^4$ and $R^5$ are the same.

5. The polymer of claim 3, wherein when $R^1$ or $R^2$ is H the other is also H.

6. The polymer of claim 3, wherein when $R^4$ or $R^5$ is H the other is also H.

7. The polymer of claim 3, wherein $R^1$, $R^2$, $R^4$ and $R^5$ are all H.

8. The polymer of claim 3, wherein $R^1$, $R^2$, $R^4$ and $R^5$ are not all $CH_3$.

9. The polymer of claim 3, wherein $R^1$, $R^2$, $R^4$ and $R^5$ are not all $C_2H_5$.

10. The polymer of claim 3, wherein $R^3$ is a lower alkylene group or a substituted or unsubstituted lower alkenylene group.

11. The polymer of claim 3, wherein $R^3$ is $CH_2$, $CH_2CH_2$, $CH$=$CH$ or $CH_2CH_2CH_2$.

12. The polymer of claim 7, wherein $R^3$ is a lower alkylene group, or a substituted or unsubstituted lower alkenylene group.

13. The polymer of claim 7, wherein $R^3$ is $CH_2$, $CH_2CH_2$, $CH$=$CH$ or $CH_2CH_2CH_2$.

14. The polymer of claim 3, wherein the heteroatom is O, N or Si.

15. A ceramic material formed from the pyrolysis of the preceramic polymer of claim 2.

16. A ceramic material formed from the pyrolysis of the preceramic polymer of claim 7.

17. A method of forming fibers comprising forming a fiber from the preceramic polymer of claim 2 by dry-spinning or melt-spinning.

18. The polymer of claim 2, wherein $R^1$ is bonded to $R^5$ and $R^2$ is bonded to $R^4$.

19. The polymer of claim 2, wherein the soluble preceramic polymer contains repeat units of the formula

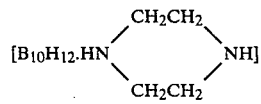

* * * * *